United States Patent
Yu et al.

(10) Patent No.: US 11,252,078 B2
(45) Date of Patent: Feb. 15, 2022

(54) DATA TRANSMISSION METHOD AND APPARATUS

(71) Applicant: Huawei Technologies Co., Ltd., Shenzhen (CN)

(72) Inventors: Wenjing Yu, Beijing (CN); Tianran Zhou, Beijing (CN); Yinben Xia, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 106 days.

(21) Appl. No.: 16/600,720

(22) Filed: Oct. 14, 2019

(65) Prior Publication Data

US 2020/0044956 A1 Feb. 6, 2020

Related U.S. Application Data

(63) Continuation of application No. PCT/CN2018/082437, filed on Apr. 10, 2018.

(30) Foreign Application Priority Data

Apr. 11, 2017 (CN) .......................... 201710232774.0

(51) Int. Cl.
 *H04L 12/721* (2013.01)
 *H04L 12/727* (2013.01)
 *H04L 12/729* (2013.01)

(52) U.S. Cl.
 CPC .......... *H04L 45/124* (2013.01); *H04L 45/121* (2013.01); *H04L 45/125* (2013.01)

(58) Field of Classification Search
 CPC ... H04L 45/124; H04L 45/121; H04L 45/125; H04L 45/70; H04L 45/38; H04L 47/125; H04L 47/122; H04L 45/586; H04L 45/123; H04L 45/74
 See application file for complete search history.

(56) References Cited

U.S. PATENT DOCUMENTS 7,665,116 B2    2/2010 Hartung et al.
10,097,464 B1 *  10/2018 Conlon ................. H04L 43/024
(Continued)

FOREIGN PATENT DOCUMENTS

CN    101634973 A    1/2010
CN    101651599 A    2/2010
(Continued)

OTHER PUBLICATIONS

Machine Translation and Abstract of Chinese Publication No. CN101651599, Feb. 17, 2010, 23 pages.
(Continued)

*Primary Examiner* — Michael K Phillips
(74) *Attorney, Agent, or Firm* — Conley Rose, P.C.

(57) ABSTRACT

The method includes, when a first data packet of a data stream is received and the first data packet is not the first data packet of the data stream, determining a time interval between a first receiving time and a second receiving time, where the first receiving time is when the first data packet is received, and the second receiving time is when a second data packet is received, obtaining a sent data amount of the data stream, and determining a transmission path of the first data packet from a plurality of available transmission paths based on the time interval and the sent data amount, and transmitting the first data packet through the determined transmission path.

18 Claims, 4 Drawing Sheets

(56) References Cited

U.S. PATENT DOCUMENTS

| | | | |
|---|---|---|---|
| 2002/0085495 A1* | 7/2002 | Jeffries | H04L 45/12 370/235 |
| 2004/0076154 A1* | 4/2004 | Mizutani | H04L 69/22 370/389 |
| 2006/0072593 A1* | 4/2006 | Grippo | H04L 47/2416 370/409 |
| 2008/0317056 A1* | 12/2008 | Curtis | H04L 45/00 370/409 |
| 2010/0020817 A1 | 1/2010 | Ebisuzaki | |
| 2011/0261758 A1* | 10/2011 | Hapsari | H04L 47/14 370/328 |
| 2014/0233574 A1* | 8/2014 | Dixon | H04L 47/34 370/394 |
| 2015/0215922 A1 | 7/2015 | Bahk et al. | |
| 2015/0304354 A1* | 10/2015 | Rogers | H04L 63/0209 726/1 |
| 2016/0226758 A1* | 8/2016 | Ashwood-Smith | H04L 43/16 |
| 2016/0285759 A1* | 9/2016 | Ryan | H04L 69/22 |
| 2016/0373343 A1* | 12/2016 | Lundqvist | H04L 45/24 |
| 2017/0078190 A1* | 3/2017 | Huang | H04L 45/70 |
| 2017/0093732 A1* | 3/2017 | Akhavain Mohammadi | H04L 45/72 |
| 2018/0278530 A1* | 9/2018 | Connor | H04L 45/70 |
| 2020/0236043 A1* | 7/2020 | Sze | H04L 43/0882 |

FOREIGN PATENT DOCUMENTS

| | | | |
|---|---|---|---|
| CN | 102185771 A | | 9/2011 |
| CN | 102469029 A | | 5/2012 |
| CN | 103501209 A | | 1/2014 |
| CN | 105871723 A | | 8/2016 |
| CN | 106102093 A | | 11/2016 |
| CN | 106453130 A | * | 2/2017 |
| CN | 106533960 A | | 3/2017 |
| EP | 2456140 A1 | | 5/2012 |
| WO | 0169866 A1 | | 9/2001 |

OTHER PUBLICATIONS

Machine Translation and Abstract of Chinese Publication No. CN103501209, May 23, 2012, 16 pages.

Machine Translation and Abstract of Chinese Publication No. CN105871723, Aug. 17, 2016, 18 pages.

Machine Translation and Abstract of Chinese Publication No. CN106102093, Nov. 9, 2016, 12 pages.

Machine Translation and Abstract of Chinese Publication No. CN106533960, Mar. 22, 2017, 11 pages.

Alizadeh, M., et al., "CONGA: Distributed Congestion-Aware Load Balancing for Datacenters," ACM SIGCOMM Computer Communication Review, ACM, Aug. 17-22, 2014, pp. 503-514.

Anjun, F., "TCP Algorithms and Multiple Paths: Considerations for the Future of the Internet," Information Systems Frontiers 6:1, XP19207594, 2004, 91-104 pages.

Kandula, S., et al., "Dynamic Load Balancing Without Packet Reordering," ACM SIGCOMM Computer Communication Review, vol. 37, No. 2, Apr. 2007, pp. 53-62.

Ford., A., et al.,"TCP Extensions for Multipath Operation with Multiple Addresses," RFC 6824, Jan. 2013, 64 pages.

Machine Translation and Abstract of Chinese Publication No. CN102185771, Sep. 14, 2011, 14 pages.

* cited by examiner

DATA TRANSMISSION METHOD AND APPARATUS

CROSS-REFERENCE TO RELATED APPLICATIONS

This application is a continuation application of International Application No. PCT/CN2018/082437, filed on Apr. 10, 2018, which claims priority to Chinese Patent Application No. 201710232774.0, filed on Apr. 11, 2017. The disclosures of the aforementioned applications are hereby incorporated by reference in their entireties.

TECHNICAL FIELD

This application relates to the field of communications technologies, and in particular, to a data transmission method and apparatus.

BACKGROUND

In a wide area network, when data transmission is performed, a plurality of available transmission paths often exist between a transmit end and a receive end of data. If one transmission path is selected from the plurality of available transmission paths for data transmission, when transmission performance of the selected transmission path is degraded, a transmission rate of data transmission through the transmission path is reduced, transmission time is prolonged, and even a data loss is caused. If at least two transmission paths are selected from the plurality of available transmission paths for data transmission, when transmission performance of one of the at least two transmission paths is degraded, remaining data may be transmitted through another transmission path with better transmission performance, thereby effectively increasing a data transmission rate. Based on the foregoing reason, a multi-path transmission method for selecting the at least two transmission paths from the plurality of available transmission paths for data transmission is widely applied to data transmission. In a related technology, when the multi-path transmission method is used to transmit a to-be-transmitted data stream, a transmit end may determine a plurality of available transmission paths based on a receive end of the data stream, where both the transmit end and the receive end may be routers. Then, the transmit end may periodically and actively measure congestion values of the plurality of available transmission paths, and constantly update the congestion values of the plurality of available transmission paths. When receiving the $1^{st}$ data packet of the data stream, the transmit end selects a transmission path with a smallest congestion value from the plurality of available transmission paths, and transmits the $1^{st}$ data packet through the selected transmission path. Then, each time the transmit end receives one data packet of the data stream, the transmit end determines a time interval between a time at which the data packet arrives at the transmit end and a time at which a previous data packet of the data stream arrives at the transmit end. When the time interval is greater than a preset time threshold, the transmit end determines the transmission path with the smallest congestion value in the plurality of available transmission paths as a transmission path of the data packet, and transmits the data packet. Otherwise, the transmit end transmits the data packet through a transmission path used by the previous data packet.

However, when the data stream includes a large quantity of data packets, and an interval between times at which every two adjacent data packets in the large quantity of data packets arrive at the transmit end is less than a preset time threshold, there is no chance to re-select a transmission path to transmit a data packet that arrives at the transmit end later, and the data packet that arrives at the transmit end later can be transmitted only through a same transmission path as the previous data packet. In an embodiment, the large quantity of data packets in the data stream are transmitted through only one transmission path. This causes a sharp increase in data load of the transmission path, and consequently, a transmission completion time of the data stream increases. In addition, another transmission path is wasted due to insufficient utilization, and utilization of the transmission path is reduced.

SUMMARY

To resolve a problem of a long transmission completion time of a data stream and low transmission path utilization in a related technology, this application provides a data transmission method. Technical solutions are as follows.

According to a first aspect, a data transmission method is provided, where the method includes, when a transmit end receives a first data packet of a data stream and the first data packet is not the $1^{st}$ data packet of the data stream, determining a time interval between a first receiving time and a second receiving time, where the first receiving time is a time at which the transmit end receives the first data packet, the second receiving time is a time at which the transmit end receives a second data packet, the first data packet and the second data packet are adjacent data packets of the data stream, and the second data packet is before the first data packet, obtaining, by the transmit end, a sent data amount of the data stream, where the sent data amount is a data amount sent before the first receiving time, and determining, by the transmit end, a transmission path of the first data packet from a plurality of available transmission paths based on the time interval and the sent data amount, and transmitting the first data packet to a receive end through the determined transmission path, where the plurality of available transmission paths are transmission paths that can be used by the transmit end to transmit the data stream to the receive end.

In this embodiment of the present disclosure, when the transmit end receives the first data packet of the data stream and the first data packet is not the $1^{st}$ data packet of the data stream, the transmit end may determine a time interval between the first data packet and a previous data packet, namely, a second data packet, and may obtain the sent data amount. Then, the transmit end may select a transmission path from the plurality of available transmission paths based on the time interval and the sent data amount, to transmit the first data packet. In other words, selection of the transmission path of the first data packet depends not only on the time interval, but also on the sent data amount. In this way, a corresponding transmission path may be selected for each to-be-transmitted data packet from the plurality of available transmission paths based on different time intervals and sent data amounts. This avoids a problem that when a large quantity of data packets in the data stream arrive densely, there is no chance to re-select a transmission path because an interval between times at which adjacent data packets arrive at the transmit end is excessively small, thereby effectively increasing a data transmission rate and transmission path utilization.

In a possible design, the determining, by the transmit end, a transmission path of the first data packet from a plurality of available transmission paths based on the time interval and the sent data amount includes, when the time interval is less than a preset time threshold and the sent data amount is not less than a preset traffic threshold, selecting, by the transmit end, a transmission path with a maximum available bandwidth from the plurality of available transmission paths, and determining, by the transmit end, the selected transmission path as the transmission path of the first data packet.

It should be noted that, when the time interval between the first data packet and the second data packet is less than the preset time threshold, whether the sent data amount is less than the preset traffic threshold may be further determined. When the sent data amount is not less than the preset traffic threshold, the transmission path with the maximum available bandwidth is selected from the plurality of available transmission paths, and the selected transmission path is determined as the transmission path of the first data packet. This avoids a problem that when a large quantity of data packets in the data stream arrive densely, there is no chance to re-select a transmission path because an interval between times at which adjacent data packets arrive at the transmit end is excessively small, and only one transmission path is used for transmission. In other words, there is a chance to select an appropriate transmission path to transmit each to-be-transmitted data packet in the data stream such that a data transmission rate is increased, a transmission completion time of the data stream is shortened, and transmission path utilization is increased. In addition, when the sent data amount is not less than the preset traffic threshold, it may be determined that the data stream to which the first data packet belongs is a large data stream with a relatively large data amount. In a data transmission process, an available bandwidth of the transmission path is a main factor that affects a transmission rate of the large data stream. To be specific, a bandwidth requirement of the large data stream for the transmission path is higher. Therefore, when the time interval is less than the preset time threshold and the sent data amount is not less than the preset traffic threshold, the transmission path with the maximum available bandwidth is selected to transmit the first data packet such that a data transmission rate can further be increased, and a transmission completion time of the data stream is shortened.

In a possible design, the determining, by the transmit end, a transmission path of the first data packet from a plurality of available transmission paths based on the time interval and the sent data amount includes, when the time interval is less than a preset time threshold and the sent data amount is less than a preset traffic threshold, selecting, by the transmit end, a transmission path with a minimum transmission delay from the plurality of available transmission paths, and determining, by the transmit end, the selected transmission path as the transmission path of the first data packet.

In this embodiment of the present disclosure, when the time interval is less than the preset time threshold and the sent data amount is less than the preset traffic threshold, to ensure timely sending of the first data packet, the transmit end may temporarily determine that the data stream to which the first data packet belongs is a small data stream with a relatively small data amount. In a transmission process, the transmission delay of the transmission path is a main factor that restricts a transmission rate of the small data stream, to be specific, a transmission delay requirement of the small data stream for the transmission path is more stringent. In this case, the transmission path with the minimum transmission delay is selected from the plurality of available transmission paths to transmit the first data packet such that a transmission rate of the first data packet can further be increased, and a transmission completion time of the data stream is shortened.

In a possible design, after the determining, by the transmit end, the selected transmission path as the transmission path of the first data packet, the method further includes adding, by the transmit end, a data amount of the first data packet to the sent data amount of the data stream, to update the sent data amount of the data stream.

It should be noted that after determining the transmission path of the first data packet when the time interval is less than the preset time threshold, when a subsequent data packet arrives and a time interval between the subsequent data packet and the first data packet is still less than the preset time threshold, the transmit end may add the data amount of the first data packet to the sent data amount to update the sent data amount of the data stream, to continue to select a transmission path for the subsequent data packet more accurately using the sent data amount.

In a possible design, the determining, by the transmit end, a transmission path of the first data packet from a plurality of available transmission paths based on the time interval and the sent data amount includes, when the time interval is not less than a preset time threshold, selecting, by the transmit end, a transmission path with a minimum transmission delay from the plurality of available transmission paths, and determining, by the transmit end, the selected transmission path as the transmission path of the first data packet.

It should be noted that, when the time interval between the first data packet and a second data packet is not less than the preset time threshold, to be specific, data packets in the data stream do not arrive densely. In this case, the transmission path with the minimum transmission delay may be selected from the plurality of available transmission paths to transmit the first data packet, thereby increasing a transmission rate of the first data packet.

In a possible design, after the determining, by the transmit end, the selected transmission path as the transmission path of the first data packet, the method further includes updating, by the transmit end, the sent data amount of the data stream to a data amount of the first data packet.

When the time interval is not less than the preset time threshold, the transmit end selects the transmission path with the minimum delay for the first data packet. In fact, the transmit end processes the first data packet in a manner of processing the $1^{st}$ data packet of the data stream. Because there is no other data packet before the $1^{st}$ data packet of the data stream, after selecting the transmission path, the transmit end sets the sent data amount to a data amount of the $1^{st}$ data packet. Similarly, the transmit end processes, in a manner of processing the $1^{st}$ data packet of the data stream, the first data packet when the time interval is less than the preset time threshold. Therefore, after selecting the transmission path for the first data packet, the transmit end may clear the previously accumulated sent data amount, and directly update the sent data amounts to a data amount of the first data packet.

In a possible design, after the transmit end receives the first data packet of the data stream, the method further includes, when the first data packet is the $1^{st}$ data packet of the data stream, selecting, by the transmit end, a transmission path with a minimum transmission delay from the plurality of available transmission paths, and determining, by the transmit end, the selected transmission path as the transmission path of the first data packet, and transmitting the first data packet to the receive end.

It should be noted that when the first data packet is the $1^{st}$ data packet of the data stream, the second data packet does not exist, and the time interval cannot be determined, and the sent data amount does not exist. In this case, the transmit end may temporarily determine that the data stream to which the first data packet belongs is a small data stream. In a transmission process, the transmission delay of the transmission path is a main factor that restricts a transmission rate of the small data stream, to be specific, a transmission delay requirement of the small data stream for the transmission path is more stringent. Therefore, the transmission path with the minimum transmission delay is selected from the plurality of available transmission paths to transmit the $1^{st}$ data packet, thereby ensuring that the $1^{st}$ data packet can be transmitted at a relatively high transmission rate, ensuring a transmission rate of the data stream, and shortening a transmission completion time of the data stream.

In a possible design, a receiving time of a data packet of the data stream and the sent data amount of the data stream are stored in a flow entry of the data stream, and the flow entry is established after the transmit end receives the $1^{st}$ data packet of the data stream.

In this embodiment of the present disclosure, to facilitate management of a receiving time of the data packet of the data stream and the sent data amount of the data stream, when the $1^{st}$ data packet of the data stream is received, a flow entry may be established for the data stream, and the receiving time of the data packet and the sent data amount of the data stream are stored in the flow entry such that the receiving time is quickly and conveniently obtained subsequently from the flow entry to determine the time interval, and further, the transmission path of the first data packet is determined based on the time interval and the sent data amount in the flow entry.

According to a second aspect, a data transmission apparatus is provided, where the data transmission apparatus has a function of implementing the data transmission method in the first aspect, the data transmission apparatus includes at least one module, and the at least one module is configured to implement the data transmission method provided in the first aspect.

According to a third aspect, a data transmission apparatus is provided, where a structure of the data transmission apparatus includes a processor and a memory, and the memory is configured to store a program that supports the data transmission apparatus in executing the data transmission method provided in the first aspect, and store related data used to implement the data transmission method provided in the first aspect. The processor is configured to execute the program stored in the memory. An operation apparatus of the storage device may further include a communications bus, and the communications bus is configured to establish a connection between the processor and the memory.

According to a fourth aspect, an embodiment of the present disclosure provides a computer storage medium configured to store a computer software instruction used by the foregoing data transmission apparatus, or store a related program used to execute the data transmission apparatus according to the second aspect.

According to a fifth aspect, an embodiment of the present disclosure provides a computer program product that includes an instruction. When the computer program product runs on a computer, the computer performs the data transmission method according to the first aspect.

Technical effects obtained in the second aspect, the third aspect, the fourth aspect, and the fifth aspect of the embodiments of the present disclosure are similar to the technical effects obtained using a corresponding technical means in the first aspect, and details are not described herein again.

The technical solutions provided in this application bring the following beneficial effects. When the first data packet of the data stream is received, the time interval between the receiving time of the first data packet and the receiving time of the second data packet is determined, where the second data packet is a data packet adjacent to the first data packet in the data stream, and the second data packet is before the first data packet. Then, the sent data amount is obtained, the transmission path is selected for the first data packet from the plurality of available transmission paths based on the determined time interval and the obtained sent data amount, and the first data packet is transmitted through the selected transmission path. Selection of the transmission path of the first data packet depends not only on the time interval between the first data packet and the previous data packet, but also on the data amount sent before the receiving time of the first data packet. In this way, a corresponding transmission path may be selected for each to-be-transmitted data packet from the plurality of available transmission paths based on different time intervals and sent data amounts. This avoids a problem that when a large quantity of data packets in the data stream arrive densely, there is no chance to re-select a transmission path because an interval between times at which adjacent data packets arrive at the transmit end is excessively small, thereby effectively increasing a data transmission rate and transmission path utilization.

DESCRIPTION OF EMBODIMENTS

To make the objectives, technical solutions, and advantages of this application clearer, the following further describes the implementations of this application in detail with reference to the accompanying drawings.

Figure 1:
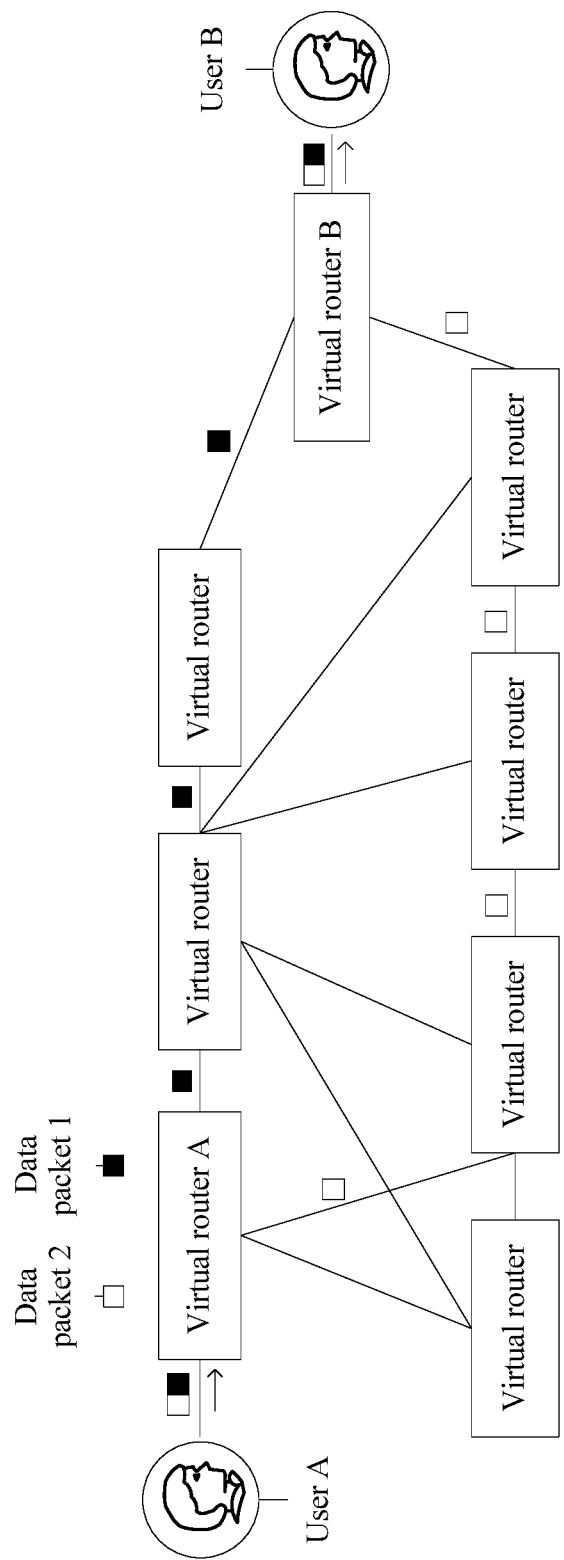
FIG. 1 is a schematic diagram of an implementation environment of a data transmission method according to an embodiment of the present disclosure.

FIG. 1 is a schematic diagram of an implementation environment of a data transmission method according to an embodiment of the present disclosure. With the development of network technologies, an overlay network is widely used. The overlay network is a virtual network established on an existing wide area network, to be specific, construction of the overlay network needs to be implemented using an existing physical network. The overlay network mainly includes three parts an edge device, a control plane, and a forwarding plane. The edge device of the overlay network may be a physical network device or a virtual network device, or may even be implemented using software running on a virtual machine. The data transmission method provided in this embodiment of the present disclosure may be applied to the overlay network. As shown in FIG. 1, an overlay network includes a plurality of virtual routers. Each user can access the overlay network using one virtual router. As shown in FIG. 1, when a user A transmits data to a user B, a virtual router A corresponding to the user A is an ingress router, namely, a transmit end, through which the data enters the overlay network. A virtual router B corresponding to the user B is an egress router, namely, a receive end, through which the data is output from the overlay network. There are usually a plurality of available transmission paths between the virtual router A and the virtual router B. The plurality of available transmission paths form a transmission path pool between the user A and the user B. When a data packet 1 and a data packet 2 in a data stream sent by the user A reach the virtual router A, the virtual router A may separately select an appropriate transmission path for the data packet 1 and the data packet 2 from the plurality of available transmission paths between the virtual router A and the virtual router B using the data transmission method provided in this application in order to transmit the data packet 1 and the data packet 2 to the virtual router B.

Certainly, the data transmission method provided in this application may be used not only in the overlay network, but also in a wide area network in which no overlay network is deployed. The wide area network in which no overlay network is deployed may include a plurality of physical routers. When the user A transmits data to the user B, a physical router A corresponding to the user A is a transmit end. The transmit end may also select, using the data transmission method provided in this application, an appropriate transmission path for each data packet in a data stream sent by the user A, and transmit the data to a receive end, namely, a physical router B corresponding to the user B, through the selected transmission path.

It should be noted that the data transmission method provided in this application is used in interaction between the transmit end and the receive end. Both the transmit end and the receive end may be network devices. The network device may be a virtual network device in the overlay network. The virtual network device may be a virtual device embedded in a physical server and implemented based on a software virtualization technology, for example, a virtual router or a virtual switch. Certainly, the network device may also be a physical network device in a network, for example, a physical router or a physical switch.

Figure 2:
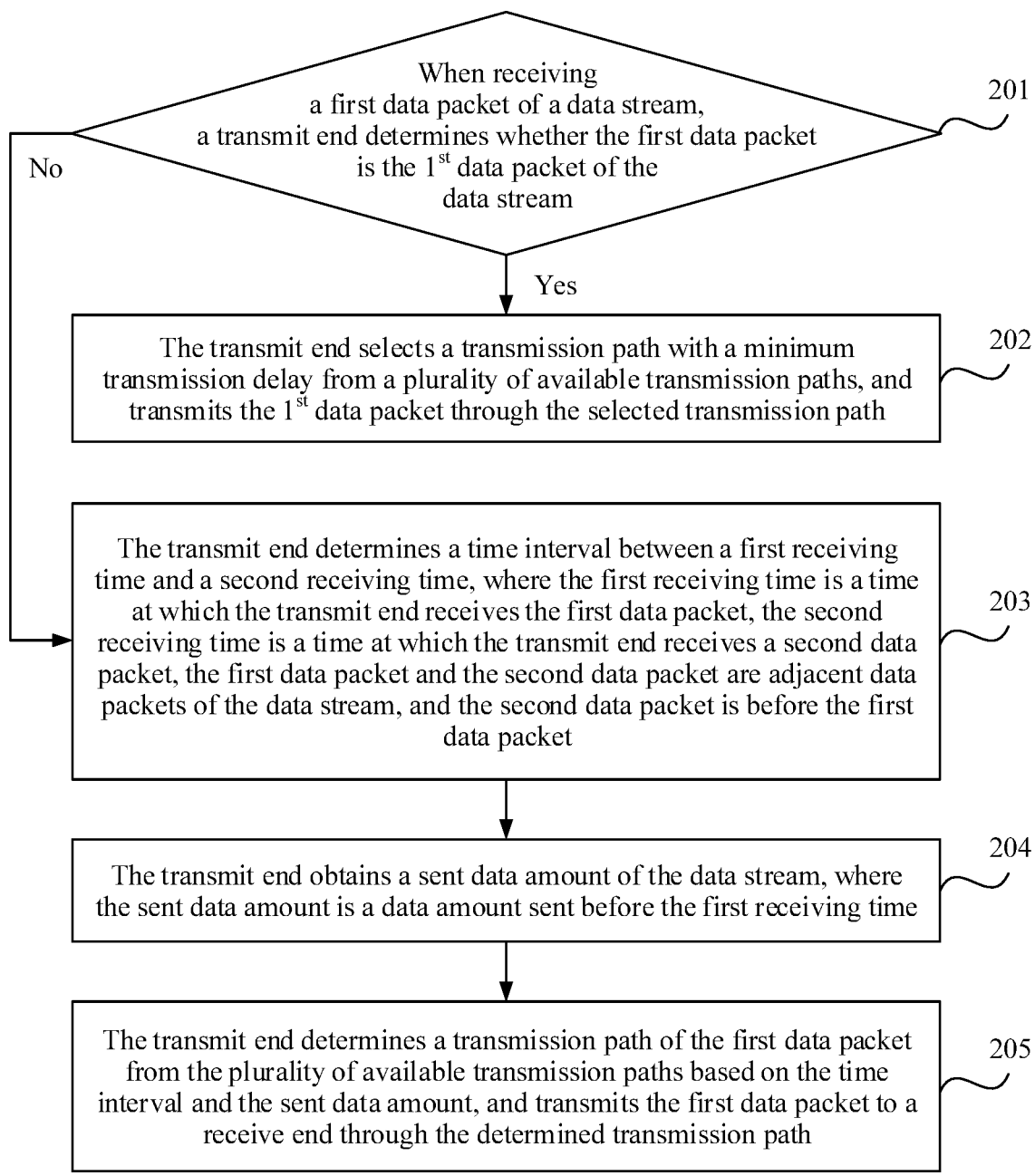
FIG. 2 is a flowchart of a data transmission method according to an embodiment of the present disclosure.

An embodiment of the present disclosure provides a data transmission method. The data transmission method may be applied to a transmit end. Referring to FIG. 2, the method includes the following steps.

Step 201. When receiving a first data packet of a data stream, the transmit end determines whether the first data packet is the $1^{st}$ data packet of the data stream. When the first data packet is the $1^{st}$ data packet of the data stream, step 202 is performed. When the first data packet is not the $1^{st}$ data packet of the data stream, step 203 is performed.

In this embodiment of the present disclosure, the transmit end may select a transmission path for the data packet of the data stream using a time interval between received two adjacent data packets in the data stream and a sent data amount of the data stream. For the $1^{st}$ data packet of the data stream, because there is no time interval between the $1^{st}$ data packet and a previous data packet and there is no sent data amount of the data stream, the transmit end cannot select the transmission path using the time interval and the sent data amount. Therefore, in this embodiment of the present disclosure, when receiving the first data packet, the transmit end first needs to determine whether the data packet is the $1^{st}$ data packet of the data stream. If the first data packet is the $1^{st}$ data packet of the data stream, the transmit end may determine a transmission path of the $1^{st}$ data packet using step 202, and transmit data through the determined transmission path. If the first data packet is not the $1^{st}$ data packet of the data stream, the transmit end may determine the transmission path of the first data packet using steps 203 to 205, and transmit the first data packet through the determined transmission path.

Generally, one data stream may include a plurality of data packets. When receiving a data packet of the data stream, the transmit end may determine a source internet protocol (IP) address and a destination IP address of the data packet based on information carried in the data packet. When the source IP address or the destination IP address of the first data packet received by the transmit end is different from that of the previous data packet, it may be determined that the received first data packet and the previous data packet do not belong to the same data stream, to be specific, the currently received data packet is the $1^{st}$ data packet of the data stream. When the source IP address and the destination IP address of the first data packet received by the transmit end are the same as the source IP address and the destination IP address of the previous data packet, it may be determined that the received first data packet is not the $1^{st}$ data packet of the data stream.

Step 202. The transmit end selects a transmission path with a minimum transmission delay from a plurality of available transmission paths, and transmits the $1^{st}$ data packet through the selected transmission path.

When determining that the received first data packet is the $1^{st}$ data packet of the data stream, the transmit end may determine a receive end based on a destination IP address of the first data packet. Then, the transmit end may obtain a plurality of available transmission paths between the transmit end and the receive end, and actively calculate transmission delays and available bandwidths of the plurality of available transmission paths. Finally, the transmit end may select a transmission path with a minimum transmission delay from the plurality of available transmission paths, and determine the selected transmission path as the transmission path of the first data packet in order to transmit the first data packet. The plurality of available transmission paths are all transmission paths that can be used for data transmission between the transmit end and the receive end.

In addition, in a subsequent transmission process of the data stream, at a preset time interval, the transmit end may further periodically and actively calculate the transmission delays and the available bandwidths of the plurality of available transmission paths in order to update stored transmission delays and available bandwidths of the plurality of available transmission paths, thereby ensuring that each data packet of the data stream can be transmitted through a current transmission path with a minimum transmission delay or a current transmission path with a maximum available bandwidth.

It should be noted that, after the transmit end determines that the first data packet is the $1^{st}$ data packet of the data stream, when receiving a subsequent data packet of the data stream, the transmit end needs to obtain the sent data amount and calculate an interval between receiving times of every two adjacent data packets. Therefore, the transmit end needs to record a receiving time of each data packet of the data stream and a sent data amount before the receiving time of each data packet. Further, to facilitate subsequent management and storage of a receiving time of a data packet of the data stream and a sent data amount of the data stream, after determining that the first data packet is the $1^{st}$ data packet of the data stream, the transmit end may establish a flow entry for the data stream. Then, the data amount of the $1^{st}$ data packet is determined as the sent data amount, and the determined sent data amount and the receiving time of the $1^{st}$ data packet are stored in the flow entry.

Certainly, for ease of operation, the transmit end may not need to establish the flow entry of the data stream, but directly determine the data amount of the $1^{st}$ data packet as the sent data amount, and store the sent data amount and the receiving time of the $1^{st}$ data packet. In other words, storing the receiving time and the sent data amount using the flow entry is only an optional implementation. In an embodiment, the receiving time and the sent data amount may further be stored in another implementation. This embodiment of the present disclosure is described using an example in which the receiving time and the sent data amount are stored in the flow entry.

When the first data packet received by the transmit end is the $1^{st}$ data packet of the data stream, the transmission path may be selected for the $1^{st}$ data packet using the foregoing method, and the receiving time and the sent data amount of the $1^{st}$ data packet are stored. When the first data packet is not the $1^{st}$ data packet of the data stream, the transmit end may select the transmission path for the first data packet using steps 203 to 205, and transmit the first data packet through the selected transmission path.

Step 203. The transmit end determines a time interval between a first receiving time and a second receiving time, where the first receiving time is a time at which the transmit end receives the first data packet, the second receiving time is a time at which the transmit end receives a second data packet, the first data packet and the second data packet are adjacent data packets of the data stream, and the second data packet is before the first data packet.

When the transmit end receives the first data packet of the data stream and the first data packet is not the $1^{st}$ data packet of the data stream, the transmit end may record the first receiving time at which the first data packet is received. Because the first data packet is not the $1^{st}$ data packet of the data stream, to be specific, a second data packet exists before the first data packet, the transmit end may obtain, from the flow entry, a receiving time of the second data packet adjacent to the first data packet, namely, a second receiving time, and calculate a difference between the first receiving time and the second receiving time in order to obtain a time interval.

After the time interval between the first data packet and the second data packet is determined, the transmit end may directly replace the second receiving time in the flow entry of the data stream with the first receiving time such that the time interval can be quickly determined using the only one receiving time stored in the flow entry when a next data packet is received. Certainly, the transmit end may directly store the first receiving time in the flow entry. In this case, the flow entry of the data stream stores a plurality of receiving times. Correspondingly, when receiving a data packet of the data stream again, the transmit end may select a receiving time closest to a current time from the plurality of receiving times stored in the flow entry, and determine the selected receiving time as the second receiving time.

Step 204. The transmit end obtains a sent data amount of the data stream, where the sent data amount is a data amount sent before the first receiving time.

After the time interval between the first data packet and the second data packet is determined, the transmit end may obtain the sent data amount of the data stream from the flow entry of the data stream. The flow entry of the data stream may store only one sent data amount, and the sent data amount is the sent data amount that is latest updated from the current time. Certainly, the flow entry of the data stream may also store a plurality of sent data amounts before the first receiving time. When the flow entry of the data stream stores the plurality of sent data amounts, the transmit end may obtain, from the plurality of sent data amounts, a sent data amount whose storage time is closest to the current time.

Step 205. The transmit end determines a transmission path of the first data packet from the plurality of available transmission paths based on the time interval and the sent data amount, and transmits the first data packet to a receive end through the determined transmission path.

After determining the time interval and obtaining the sent data amount, the transmit end may determine the transmission path of the first data packet from the plurality of available transmission paths using the following steps (1) to (3) based on the time interval and the sent data amount.

(1) The transmit end may determine whether the time interval is less than a preset time threshold. When the time interval is less than the preset time threshold, step (2) is performed. When the time interval is not less than the preset time threshold, step (3) is performed.

(2) The transmit end determines whether the sent data amount is less than a preset traffic threshold. When the sent data amount is not less than the preset traffic threshold, the transmit end selects a transmission path with a maximum available bandwidth from the plurality of available transmission paths, and determines the selected transmission path as the transmission path of the first data packet. When the sent data amount is less than the preset traffic threshold, the transmit end selects a transmission path with a minimum transmission delay from the plurality of available transmission paths, and determines the selected transmission path as the transmission path of the first data packet.

When the transmit end determines that the time interval between the first data packet and the second data packet is less than the preset time threshold and that the sent data amount is not less than the preset traffic threshold, the transmit end may determine that the data stream to which the first data packet belongs is a large data stream with a relatively large data amount. In a transmission process, the available bandwidth of the transmission path has far greater impact on a transmission rate of the large data stream than the transmission delay. In other words, an available bandwidth requirement of the large data stream for the transmission path is more stringent. Therefore, when it is determined that the data stream to which the first data packet belongs is the large data stream, the transmit end may select, from the plurality of available transmission paths, the transmission path with the maximum available bandwidth as the transmission path of the first data packet, and transmit the first data packet through the selected transmission path such that a transmission rate of the first data packet is increased, a transmission rate of the data stream is increased, and a transmission completion time of the data stream is shortened.

When the transmit end determines that the time interval between the first data packet and the second data packet is less than the preset time threshold and the sent data amount is less than the preset traffic threshold, in this case, because the transmit end cannot learn whether a total data amount of the data stream is greater than the preset traffic threshold, it cannot be completely determined whether the data stream is a large data stream or a small data stream. However, to ensure timely sending of the first data packet, the transmit end may temporarily determine, based on the sent data amount, that the data stream to which the first data packet belongs is a small data stream with a relatively small data amount. In a data transmission process, the transmission delay of the transmission path has far less impact on a transmission rate of the small data stream than the available bandwidth. In other words, a transmission delay requirement of the small data stream for the transmission path is more stringent. In this case, the transmit end may select a transmission path with a minimum transmission delay from the plurality of available transmission paths as the transmission path of the first data packet, and transmit the first data packet through the selected transmission path such that a transmission rate of the first data packet is increased, and a transmission completion time of the data stream is shortened.

Further, after the transmission path of the first data packet is determined, because a current sent data amount does not reach the preset traffic threshold, if a time interval between the first data packet and a subsequent data packet is still less than the preset time threshold, the transmit end needs to select the transmission path with the maximum available bandwidth for the subsequent data packet based on an accumulated sent data amount. To be specific, to ensure that when the subsequent data packet arrives, the transmit end may continue to select the transmission path for the data packet more accurately using the sent data amount, the transmit end needs to add a data amount of the first data packet to the sent data amount of the data stream in order to update the sent data amount of the data stream. Correspondingly, when the transmit end receives the second data packet, if the time interval between the second data packet and the previous data packet is less than the preset time threshold, it may be learned that after the transmission path of the second data packet is determined, the sent data amount in the flow entry is updated using the foregoing method. To be specific, the sent data amount obtained by the transmit end from the flow entry when receiving the first data packet is an accumulated data amount of a plurality of sent data packets before the first receiving time.

Certainly, if the first data packet received by the transmit end is the $2^{nd}$ data packet of the data stream, the sent data amount obtained by the transmit end using step 204 is a data amount of the second data packet. In this case, the second data packet is the $1^{st}$ data packet of the data stream.

(3) The transmit end selects a transmission path with a minimum transmission delay from the plurality of available transmission paths, and determines the selected transmission path as the transmission path of the first data packet.

When the transmit end determines that the time interval between the first data packet and the second data packet is greater than the preset time threshold, there is no problem that there is no chance to re-select a transmission path for adjacent data packets because the time interval is excessively small. Therefore, the transmit end may no longer determine whether the sent data amount is greater than the preset traffic threshold, but directly select the transmission path with the minimum transmission delay from the plurality of available transmission paths as the transmission path of the first data packet.

Further, after determining the transmission path of the first data packet when the time interval is greater than the preset time threshold, the transmit end may further update the sent data amount of the data stream to a data amount of the first data packet.

In this case, because the time interval between the first data packet and the second data packet is greater than the preset time threshold, the transmit end selects the transmission path with the minimum transmission delay for the first data packet, to be specific, the transmit end selects the transmission path for the first data packet in a manner of selecting the transmission path for the $1^{st}$ data packet of the data stream. Therefore, when the sent data amount is updated, the first data packet is also considered as the $1^{st}$ data packet, to be specific, the accumulated sent data amount before the first receiving time is cleared, and is updated to the data amount of the first data packet. Correspondingly, when the transmit end receives the second data packet, if the time interval between the second data packet and the previous data packet is greater than the preset time threshold, it may be learned that after the transmission path of the second data packet is determined, the sent data amount in the flow entry is updated using the foregoing method, to be specific, the sent data amount obtained by the transmit end from the flow entry when receiving the first data packet is the data amount of the second data packet.

For example, it is assumed that a user sends a data stream using a terminal, where the data stream includes 20 data packets, a data amount of each data packet is 100 bytes (B), a time interval between the $19^{th}$ data packet and the $20^{th}$ data packet is 100 milliseconds (ms), a time interval between remaining every two adjacent data packets is 40 ms, a preset time threshold is 50 ms, and a preset traffic threshold is 1000 B.

When receiving the $1^{st}$ data packet of the data stream, the transmit end selects the transmission path with the minimum transmission delay from the plurality of available transmission paths as the transmission path of the $1^{st}$ data packet. Meanwhile, the flow entry is established for the data stream, and a data amount 100 B of the $1^{st}$ data packet is used as the sent data amount, and is stored in the flow entry together with the receiving time of the $1^{st}$ data packet.

When receiving the $2^{nd}$ data packet, the transmit end records a receiving time of the $2^{nd}$ data packet. Then, the transmit end reads the receiving time of the $1^{st}$ data packet from the flow entry, and learns, through calculation, that a time interval between the receiving time of the $1^{st}$ data packet and the receiving time of the $2^{nd}$ data packet is 40 ms, and the sent data amount obtained from the flow entry is 100 B. Because the time interval 40 ms is less than a preset time threshold 50 ms, and the sent data amount 100 B is less than a preset traffic threshold 1000 B, when the transmit end cannot learn a total data amount of the data stream, the transmit end may temporarily determine, based on the sent data amount 100 B, that the data stream is a small data stream. Because the small data stream is more sensitive to the transmission delay, the transmit end selects the transmission path with the minimum delay from the plurality of available transmission paths, uses the selected transmission path as the transmission path of the $2^{nd}$ data packet, and transmits the $2^{nd}$ data packet through the transmission path of the $2^{nd}$ data packet. Meanwhile, because the sent data amount does not reach the preset traffic threshold, to ensure that when a subsequent data packet arrives, the transmit end can determine, based on the sent data amount, that the data stream is a large data stream or a small data stream in order to select a transmission path for the subsequent data packet, the transmit end updates the receiving time of the $1^{st}$ data packet stored in the flow entry of the data stream to the receiving time of the $2^{nd}$ data packet, and updates the sent data amount 100 B to 200 B, that is, adds a data amount of the $2^{nd}$ data packet to the sent data amount.

When receiving the $3^{rd}$ data packet to the $10^{th}$ data packet, the transmit end may select a transmission path for the data packets using the foregoing same method in order to perform data transmission.

When receiving the $11^{th}$ data packet, the transmit end may determine, based on a receiving time of the $11^{th}$ data packet and a receiving time of the $10^{th}$ data packet, that the time interval is still 40 ms, and that the sent data amount read from the flow entry is a sum of data amounts of the $1^{st}$ to $10^{th}$ data packets, to be specific, the sent data amount is 1000 B, which reaches the preset traffic threshold 1000 B. In this case, the transmit end may completely determine, based on the sent data amount, that the data stream is a large data stream. Therefore, the transmission path with the maximum available bandwidth may be selected from the plurality of available transmission paths, and the selected transmission path is used as the transmission path of the $11^{th}$ data packet, and the $11^{th}$ data packet is transmitted. Meanwhile, because the data stream is determined as a large data stream, and if a time interval between the $11^{th}$ data packet and a subsequent data packet is still less than the preset time threshold, the transmit end needs to select the transmission path with the maximum available bandwidth for the subsequent data packet based on the accumulated sent data amount. In this case, the transmit end needs to update the receiving time of the $10^{th}$ data packet in the flow entry to the receiving time of the $11^{th}$ data packet, and add a data amount of the $11^{th}$ data packet to the sent data amount, that is, update the sent data amount to 1100 B.

When receiving the $12^{th}$ to the $19^{th}$ data packets, the transmit end may select the transmission path using a method for selecting the transmission path for the $11^{th}$ data packet because all sent data amounts are greater than the preset traffic threshold.

When receiving the $20^{th}$ data packet, the transmit end may determine, based on a receiving time of the $20^{th}$ data packet and a receiving time of the $19^{th}$ data packet that is obtained from the flow entry, that the time interval is 100 ms, and the sent data amount obtained from the flow entry is 1900 B. In this case, because the determined time interval 100 ms is greater than a preset time interval 50 ms, the transmit end processes the $20^{th}$ data packet in a manner of processing the $1^{st}$ data packet of the data stream, and does not determine whether the sent data amount is greater than the preset traffic threshold, but directly selects the transmission path with the minimum delay from the plurality of available transmission paths, and determines the selected transmission path as a transmission path of the $20^{th}$ data packet, and transmits the $20^{th}$ data packet. In addition, because the transmit end cannot determine that the $20^{th}$ data packet is a last data packet of the data stream, a receiving time in the flow entry further needs to be updated to an update time of the $20^{th}$ data packet. In addition, because the transmit end processes the $20^{th}$ data packet in a manner of processing the $1^{st}$ data packet, after determining the transmission path of the $20^{th}$ data packet, the transmit end should also update the sent data amount in a manner of setting the sent data amount after determining the transmission path of the $1^{st}$ data packet, that is, clear the previously accumulated sent data amount before the $20^{th}$ data packet, and update the sent data amount to a data amount of the $20^{th}$ data packet.

In this embodiment of the present disclosure, when the transmit end receives the first data packet of the data stream and the first data packet is not the $1^{st}$ data packet of the data stream, the transmit end determines the time interval between the receiving time of the first data packet and the receiving time of the second data packet, and obtains the sent data amount. The second data packet is a data packet adjacent to the first data packet in the data stream, and the second data packet is before the first data packet. Then, the transmit end selects the transmission path for the first data packet from the plurality of available transmission paths based on the time interval and the sent data amount, and transmits the first data packet through the selected transmission path. Selection of the transmission path of the first data packet depends not only on the time interval between the first data packet and the previous data packet, but also on the data amount sent before the first receiving time corresponding to the first data packet. In this way, a corresponding transmission path may be selected for each to-be-transmitted data packet from the plurality of available transmission paths based on different time intervals and sent data amounts. This avoids a problem that when a large quantity of data packets in the data stream arrive densely, there is no chance to re-select a transmission path because an interval between times at which adjacent data packets arrive at the transmit end is excessively small, thereby effectively increasing a data transmission rate and transmission path utilization.

In addition, based on different time intervals and sizes of sent data amounts, the transmit end may select the transmission path with the minimum transmission delay or the transmission path with the maximum available bandwidth from the plurality of available transmission paths as the transmission path of the first data packet such that the first data packet may be transmitted through a most suitable transmission path, and a transmission rate of the data stream is further increased. In addition, the transmit end may periodically calculate the transmission delays and the available bandwidths of the plurality of available transmission paths in order to update stored transmission delays and available bandwidths. Therefore, for each data packet in the data stream, the transmit end may select the last updated transmission path with the minimum transmission delay or the last updated transmission path with the maximum available bandwidth to perform transmission such that a transmission rate of the data stream is further ensured.

Figure 3:
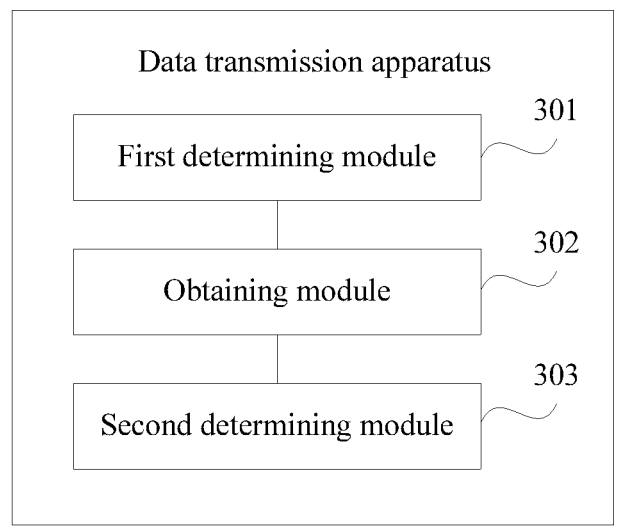
FIG. 3 is a block diagram of a data transmission apparatus according to an embodiment of the present disclosure.

Referring to FIG. 3, an embodiment of the present disclosure provides a data transmission apparatus, where the data transmission apparatus is deployed at a transmit end, the data transmission apparatus is configured to perform the method shown in FIG. 2, and the data transmission apparatus includes a first determining module 301, an obtaining module 302, and a second determining module 303.

The first determining module 301 is configured to perform step 203 in the foregoing embodiment.

The obtaining module 302 is configured to perform step 204 in the foregoing embodiment.

The second determining module 303 is configured to perform step 205 in the foregoing embodiment.

Optionally, the second determining module 303 includes a first selection unit configured to, when a time interval is less than a preset time threshold and a sent data amount is not less than a preset traffic threshold, select a transmission path with a maximum available bandwidth from a plurality of available transmission paths, and a first determining unit configured to determine the selected transmission path as a transmission path of a first data packet.

Optionally, the second determining module 303 includes a second selection unit configured to, when the time interval is less than the preset time threshold and the sent data amount is less than a preset traffic threshold, select a transmission path with a minimum transmission delay from the plurality of available transmission paths, and a second determining unit configured to determine the selected transmission path as the transmission path of the first data packet.

Optionally, the second determining module 303 further includes a first update unit configured to add a data amount of the first data packet to a sent data amount of a data stream, to update the sent data amount of the data stream.

Optionally, the second determining module 303 includes a third selection unit configured to, when the time interval is not less than the preset time threshold, select the transmission path with the minimum transmission delay from the plurality of available transmission paths, and a third determining unit configured to determine the selected transmission path as the transmission path of the first data packet.

Optionally, the second determining module 303 further includes a second update unit configured to update the sent data amount of the data stream to a data amount of the first data packet.

Optionally, the data transmission apparatus further includes a selection module configured to, when the first data packet is the $1^{st}$ data packet of the data stream, select the transmission path with the minimum transmission delay from the plurality of available transmission paths, and a third determining module configured to determine the selected transmission path as the transmission path of the first data packet, and transmit the first data packet to a receive end.

Optionally, a receiving time of a data packet of the data stream and the sent data amount of the data stream are stored in a flow entry of the data stream, and the flow entry is established after the transmit end receives the $1^{st}$ data packet of the data stream.

In conclusion, in this embodiment of the present disclosure, when the transmit end receives the first data packet of the data stream and the first data packet is not the $1^{st}$ data packet of the data stream, the transmit end determines the time interval between a receiving time of the first data packet and a receiving time of a second data packet, and obtains the sent data amount. The second data packet is a data packet adjacent to the first data packet in the data stream, and the second data packet is before the first data packet. Then, the transmit end selects the transmission path for the first data packet from the plurality of available transmission paths based on the time interval and the sent data amount, and transmits the first data packet through the selected transmission path. Selection of the transmission path of the first data packet depends not only on the time interval between the first data packet and a previous data packet, but also on the data amount sent before the receiving time of the first data packet. In this way, a corresponding transmission path may be selected for each to-be-transmitted data packet from the plurality of available transmission paths based on different time intervals and sent data amounts. This avoids a problem that when a large quantity of data packets in the data stream arrive densely, there is no chance to re-select a transmission path because an interval between times at which adjacent data packets arrive at the transmit end is excessively small, thereby effectively increasing a data transmission rate and transmission path utilization.

In addition, based on different time intervals and sizes of sent data amounts, the transmit end may select the transmission path with the minimum transmission delay or the transmission path with the maximum available bandwidth from the plurality of available transmission paths as the transmission path of the first data packet such that the first data packet may be transmitted through a most suitable transmission path, and a transmission rate of the data stream is further increased. In addition, the transmit end may periodically calculate the transmission delays and the available bandwidths of the plurality of available transmission paths in order to update stored transmission delays and available bandwidths. Therefore, for each data packet in the data stream, the transmit end may select the last updated transmission path with the minimum transmission delay or the last updated transmission path with the maximum available bandwidth to perform transmission such that a transmission rate of the data stream is further ensured.

Figure 4:
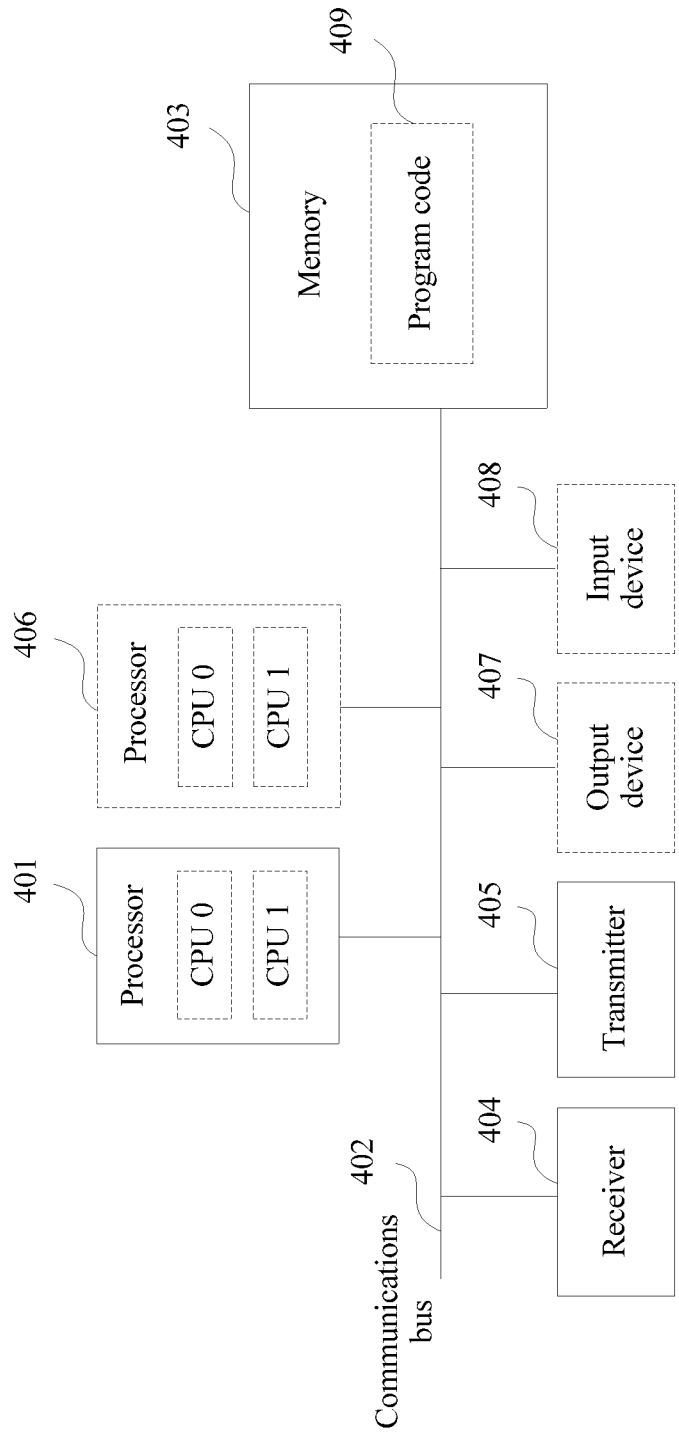
FIG. 4 is a schematic structural diagram of a network device according to an embodiment of the present disclosure.

FIG. 4 is a schematic structural diagram of a network device according to an embodiment of the present disclosure. The network device may be a virtual network device in an overlay network, or may be a physical network device in a wide area network in which no overlay network is deployed. For example, a function of a virtual router in the overlay network in FIG. 1 may be implemented using the network device. Referring to FIG. 4, the network device includes at least one processor 401, a communications bus 402, a memory 403, a receiver 404, and a transmitter 405.

The processor 401 may be a central processing unit (CPU), a microprocessor, an application-specific integrated circuit (ASIC), or one or more integrated circuits configured to control execution of programs of the solutions in this application.

The communications bus 402 may include a channel for transmitting information between the foregoing components.

The memory 403 may be a read-only memory (ROM) or another type of static storage device capable of storing static information and instructions, a random access memory (RAM), or another type of dynamic storage device capable of storing information and instructions, or may be an electrically erasable programmable read-only memory (EEPROM), a compact disc read-only memory (CD-ROM) or other compact disc storage or optical disc storage (including a compressed disc, a laser disc, an optical disc, a digital versatile disc, and a Blu-ray disc, and the like), a magnetic disk storage medium or another magnetic storage device, or any other medium that can be used to carry or store expected program code in a form of an instruction or a data structure and that can be accessed by a computer. However, this is not limited thereto. The memory 403 may exist independently, and is connected to the processor 401 using the communications bus 402. Alternatively, the memory 403 may be integrated with the processor 401.

The receiver 404 may be configured to receive a data packet of a to-be-transmitted data stream. The transmitter 405 may transmit a received data packet through a selected transmission path. In addition, the memory 403 may be configured to store one or more running programs and/or modules that are used to perform the data transmission method.

In a specific implementation, in an embodiment, the processor 401 may include one or more CPUs, such as a CPU 0 and a CPU 1 shown in FIG. 2.

In a specific implementation, in an embodiment, the network device may include a plurality of processors, for example, a processor 401 and a processor 406 shown in FIG. 2. Each of these processors may be a single-core (single-CPU) processor or may be a multi-core (multi-CPU) processor. The processor herein may be one or more devices, circuits, and/or processing cores configured to process data (for example, a computer program instruction).

In a specific implementation, in an embodiment, the network device may further include an output device 407 and an input device 408, and the output device 407 communicates with the processor 401, and may display information in a plurality of manners. For example, the output device 407 may be a liquid crystal display (LCD), a light emitting diode (LED) display device, a cathode-ray tube (CRT) display device, a projector, or the like. The input device 408 communicates with the processor 401, and may receive input of a user in a plurality of manners. For example, the input device 408 may be a mouse, a keyboard, a touchscreen device, or a sensing device.

The foregoing network device may be a general-purpose network device or a dedicated network device. In a specific implementation, the network device may be a desktop computer, a portable computer, a network server, a physical router, a switch, a personal digital assistant (PDA), a mobile phone, a tablet computer, a wireless terminal device, a communications device, or an embedded device. The type of the network device is not limited in this embodiment of the present disclosure.

The memory 403 is configured to store program code used to execute the solutions of this application, and the processor 401 controls execution. The processor 401 is configured to execute program code 409 stored in the memory 403. The program code 409 may include one or more software modules. The virtual router in the overlay network shown in FIG. 1 may determine, using the processor 401 and one or more software modules in the program code 409 in the memory 403, a transmission path used to transmit a data packet of a data stream.

It should be noted that for data transmission performed by the data transmission apparatus provided in the foregoing embodiments, only division of the foregoing function modules is used as an example for illustration. In an embodiment, the foregoing functions can be allocated to different function modules and implemented according to a requirement. To be specific, an internal structure of the data transmission apparatus is divided into different function modules to implement all or some of the functions described above. In addition, the data transmission apparatus provided in the foregoing embodiments and the data transmission method embodiment have a same idea. For a specific implementation process of the data transmission apparatus, refer to the method embodiment. Details are not described herein again.

It should be understood that first, second, and various reference numerals in this specification are distinguished only for ease of description, and are not used to limit the scope of the embodiments of the present disclosure.

It should be further understood that sequence numbers of the foregoing processes/steps do not mean execution sequences in various embodiments of this application. The execution sequences of the processes should be determined according to functions and internal logic of the processes, and should not constitute any limitation on the implementation processes of the embodiments of the present disclosure.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

A person of ordinary skill in the art may understand that all or some of the steps of the embodiments may be implemented by hardware or a program instructing related hardware. The program may be stored in a computer-readable storage medium. The above mentioned storage medium may be a read-only memory, a magnetic disk, an optical disc, or the like.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data transmission method, implemented by a transmit end, comprises:
   determining, by the transmit end, a time interval between a first receiving time and a second receiving time responsive to the transmit end receiving a first data packet of a data stream and responsive to the first data packet not being an initial packet of the data stream, wherein the first receiving time is when the transmit end receives the first data packet and the second receiving time is when the transmit end receives a second data packet, wherein the first data packet and the second data packet are adjacent in the data stream, and wherein the second data packet is before the first data packet;
   obtaining, by the transmit end, a data amount of the data stream, wherein the data amount is an amount of data sent before the first receiving time;
   determining, by the transmit end, a transmission path for the first data packet from available transmission paths based on the time interval and the data amount; and
   transmitting, by the transmit end, the first data packet to a receive end through the determined transmission path,
   wherein the available transmission paths can be used by the transmit end to transmit the data stream to the receive end.

2. The data transmission method of claim 1, wherein the determined transmission path is a transmission path with a maximum available bandwidth from the available transmission paths when the time interval is less than a preset time threshold and the data amount of the data stream is not less than a preset traffic threshold.

3. The data transmission method of claim 1, wherein the determined transmission path is a transmission path with a minimum transmission delay from the available transmission paths when the time interval is less than a preset time threshold and the data amount of the data stream is less than a preset traffic threshold.

4. The data transmission method of claim 2, wherein after determining the transmission path, the method further comprises updating the data amount by adding another data amount of the first data packet to the data amount.

5. The data transmission method of claim 1, wherein the determined transmission path is a transmission path with a minimum transmission delay from the available transmission paths when the time interval is not less than a preset time threshold.

6. The data transmission method of claim 5, wherein after determining the transmission path, the method further comprises updating the data amount to be another data amount of the first data packet.

7. The data transmission method of claim 1, wherein the first receiving time, the second receiving time, and the data amount are stored in a flow entry of the data stream, and wherein the flow entry is established after the transmit end receives the first data packet of the data stream.

8. A data transmission apparatus, deployed at a transmit end, comprising:
a processor; and
a memory coupled to the processor and storing one or more programs that, when executed by the processor, cause the data transmission apparatus to be configured to:
determine a time interval between a first receiving time and a second receiving time responsive to the transmit end receiving a first data packet of a data stream and responsive to the first data packet not being an initial packet of the data stream, wherein the first receiving time is when the first data packet is received and the second receiving time is when a second data packet is received, wherein the first data packet and the second data packet are adjacent in the data stream, and wherein the second data packet is before the first data packet;
obtain a data amount of the data stream, wherein the data amount is an amount of data sent before the first receiving time;
determine a transmission path for the first data packet from available transmission paths based on the time interval and the data amount; and
transmit the first data packet to a receive end through the determined transmission path,
wherein the available transmission paths can be used by the transmit end to transmit the data stream to the receive end.

9. The data transmission apparatus of claim 8, wherein the programs further cause the data transmission apparatus to select as the determined transmission path a transmission path with a maximum available bandwidth from the available transmission paths when the time interval is less than a preset time threshold and the data amount of the data stream is not less than a preset traffic threshold.

10. The data transmission apparatus of claim 8, wherein the programs further cause the data transmission apparatus to select as the determined transmission path a transmission path with a minimum transmission delay from the available transmission paths when the time interval is less than a preset time threshold and the data amount of the data stream is less than a preset traffic threshold.

11. The data transmission apparatus of claim 9, wherein the programs further cause the data transmission apparatus to update the data amount by adding another data amount of the first data packet to the data amount.

12. The data transmission apparatus of claim 8, wherein the programs further cause the data transmission apparatus to select as the determined transmission path a transmission path with a minimum transmission delay from the available transmission paths when the time interval is not less than a preset time threshold.

13. The data transmission apparatus of claim 12, wherein after selecting the transmission path, the programs further cause the data transmission apparatus to update the data amount to be another data amount of the first data packet.

14. The data transmission apparatus of claim 8, wherein the first receiving time, the second receiving time, and the data amount are stored in a flow entry of the data stream, and wherein the flow entry is established after the transmit end receives the first data packet of the data stream.

15. A computer program product comprising computer-executable instructions stored on a non-transitory computer-readable medium that, when executed by a processor, cause a data transmission apparatus to:
determine a time interval between a first receiving time and a second receiving time responsive to the data transmission apparatus receiving a first data packet of a data stream and responsive to the first data packet not being an initial packet of the data stream, wherein the first receiving time is when the first data packet is received and the second receiving time is when a second data packet is received, wherein the first data packet and the second data packet are adjacent in the data stream, and wherein the second data packet is before the first data packet;
obtain a data amount of the data stream, wherein the data amount is an amount of data sent before the first receiving time;
determine a transmission path for the first data packet from available transmission paths based on the time interval and the data amount; and
transmit the first data packet to a receive end through the determined transmission path,
wherein the available transmission paths can be used by a transmit end to transmit the data stream to the receive end.

16. The computer program product of claim 15, wherein the computer-executable instructions further cause the data transmission apparatus to select as the determined transmission path a transmission path with a maximum available bandwidth from the available transmission paths when the time interval is less than a preset time threshold and the data amount of the data stream is greater than a preset traffic threshold.

17. The computer program product of claim 15, wherein the computer-executable instructions further cause the data transmission apparatus to select as the determined transmission path a transmission path with a minimum transmission delay from the available transmission paths when the time interval is less than a preset time threshold and the data amount of the data stream is less than a preset traffic threshold.

18. The computer program product of claim 16, wherein the computer-executable instructions further cause the data transmission apparatus to update the data amount by adding another data amount of the first data packet to the data amount.

* * * * *